Patented July 11, 1944

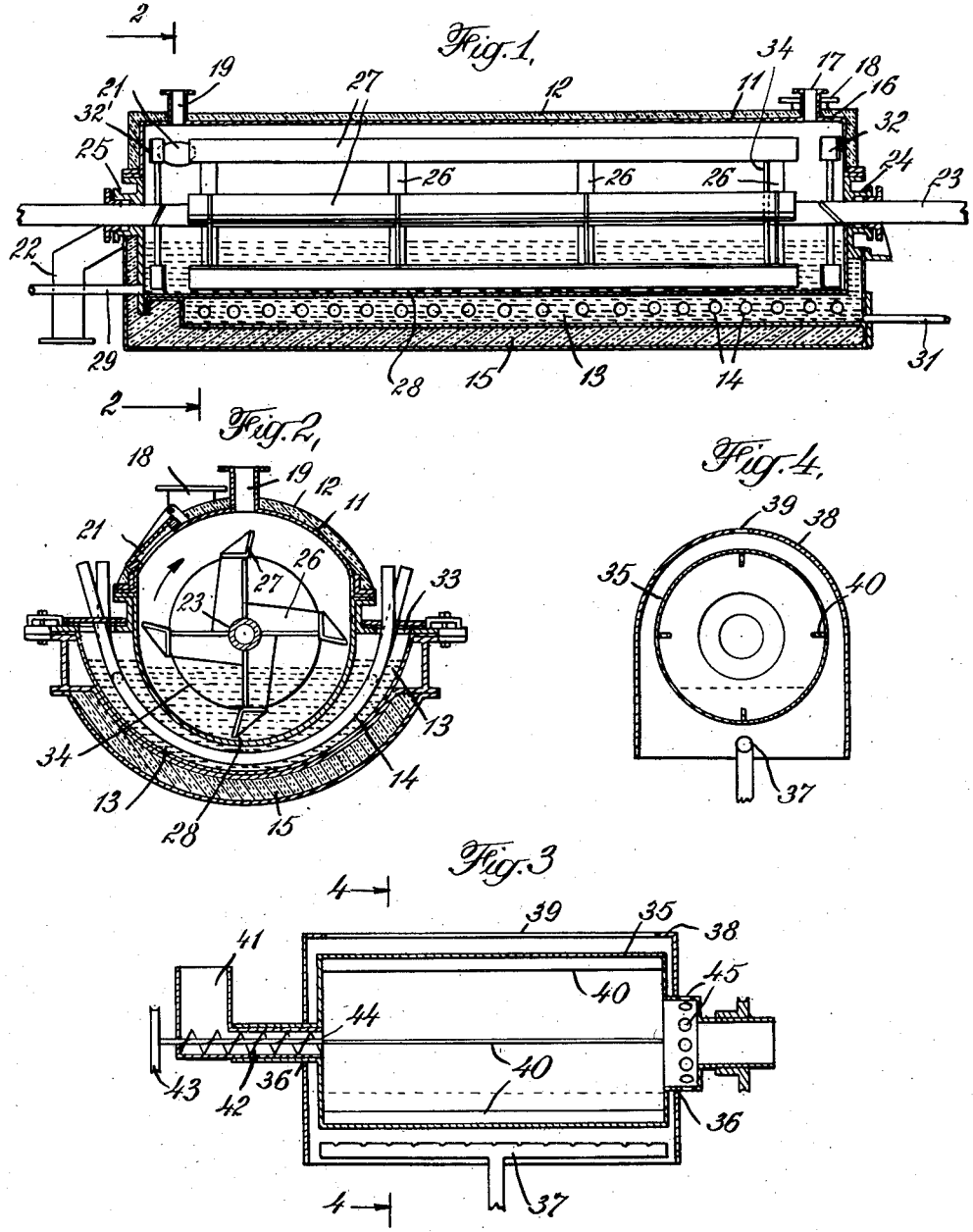

2,353,237

UNITED STATES PATENT OFFICE 2,353,237

METHOD FOR CARRYING OUT FUSION REACTIONS

John M. Harris, Jr., Springfield Township, Montgomery County, Pa., assignor, by mesne assignments, to Allied Chemical & Dye Corporation, a corporation of New York Application June 20, 1941, Serial No. 399,028

4 Claims. (Cl. 260—628)

This invention relates to carrying out fusion reactions continuously, and more particularly to processes and apparatus for carrying out continuously the reaction between the alkali metal salt of an aromatic sulfonate such as sodium benzene sulfonate and an alkali metal hydroxide, such as sodium hydroxide, to yield an alkali metal salt of an aromatic hydroxy compound, e. g., sodium phenolate.

It has been customary to carry out fusion reactions, such as the fusion of sodium hydroxide with sodium benzene sulfonate, batchwise rather than continuously. Such batchwise operation involves manifest disadvantages. In the first place, it is relatively ineconomical in that it requires reheating the fusion pot each time a new charge is to be treated and does not permit closely co-ordinating the fusion step with any subsequent operation to which the product of the fusion reaction may be subjected. In many cases, carrying out the fusion reaction batchwise necessarily prevents applying the optimum heating time to all portions of the reaction mixture, since in many fusion reactions the reactants must be added gradually to maintain the desired control over the reaction, and hence the materials first introduced will be heated too long, while those last added will be heated too short a time; prolonged heating of the materials first introduced often results in thickening of the mass to a point which renders it difficult to handle, thus reducing the yield of product. Furthermore, the gradual addition of the reactants in a batchwise fusion results in high concentration of reactant materials in contact with the product of the reaction when fresh portions of reactants are added, with consequent reduction in the yield and quality of reaction product. Finally, when batchwise operations are employed much larger and correspondingly more expensive vessels must be used to obtain the same rate of production as could be secured by using smaller vessels in continuous operation.

It is an object of this invention to provide a process for carrying out continuously fusion reactions so as to permit close and accurate control of the heating treatment or reaction time of every portion of the reaction mixture, thereby making possible an increased yield of reaction product.

Another object of this invention is to provide apparatus for practicing such continuous fusion process, which apparatus is simple in design and is efficient in operation.

I have found that the fusion of aromatic sulfonates with alkali metal hydroxides may be carried out continuously so as to avoid the above disadvantages by introducing the reactants into a fusion or reaction zone and causing them to flow therethrough while agitating the reactants in a direction perpendicular to the direction of flow through the reaction zone but avoiding substantial disturbance along the direction of flow, so that along the direction of flow the composition of the reaction mixture varies continuously from unreacted material at the point of introduction of the reactants to substantially completely reacted material at the point where the product of the reaction is withdrawn from the reaction zone, and throughout any section of the reaction mixture taken in a direction at right angles to the direction of flow the reaction mixture is substantially homogeneous. The preferred embodiment of this invention involves fusing sodium benzene sulfonate with sodium hydroxide in the manner above described since sodium phenolate may thereby be obtained in a highly advantageous manner, thus effecting a considerable improvement in the process for producing synthetic phenol. The process of my invention, by avoiding substantial intermixing of the reaction mixture in the direction of its flow and maintaining a composition of reaction mixture continuously varying from unreacted material at the point of introduction of the reactants to substantially completely reacted material at the discharge point, subjects each portion of the reaction mixture to the same amount of heat, thus preventing thickening of the mass and improving the quality and yield of the product.

As hereinabove stated, the preferred embodiment of this invention involves the fusion of sodium benzene sulfonate and sodium hydroxide; hence, the detailed description of the invention will be confined to this fusion, although, as will appear hereinafter, other fusion reactions may be carried out in accordance with my invention. Preferably, the sodium benzene sulfonate and sodium hydroxide are introduced and the reaction product withdrawn at a rate such that the reaction time is from fifteen to forty minutes, and may be about twenty minutes, while the temperature of the melt in the reaction zone is maintained at from 320° to 410° C., preferably at about 360° C.; the temperature at the inlet end is maintained at from about 320° to 360° C., preferably at about 350° C., and at the outlet or discharge end at from 380° to 410° C., preferably at about 390° C. For optimum results an excess of caustic of about 10% to 20%, preferably about 18%, above that theoretically required for the reaction is employed. Operating in accordance with this invention very high yields, up to 96%, of a high quality sodium phenolate have been obtained with a reaction time of twenty minutes or less.

In the accompanying drawing forming a part of this specification and showing for purposes of exemplification two preferred forms of apparatus for practicing this invention, without limiting the claimed invention to such illustrative instances, Figure 1 is a vertical section through a preferred form of apparatus embodying this invention;

Figure 2 is a section of the apparatus taken at right angles to the section of Figure 1, i. e., along the line 2—2 of Figure 1;

Figure 3 is a vertical section through a modified form of apparatus embodying this invention; and Figure 4 is a section of the modified apparatus taken at right angles to that of Figure 3, i. e., along the line 4—4 of Figure 3.

Referring to Figure 1, reference numeral 11 indicates a closed, substantially trough-shaped reaction vessel which preferably may be of nickel, silver or lined with these metals. This vessel is provided with suitable heat insulation, as indicated by reference numeral 12, to minimize heat losses. Heat is supplied to the vessel by means of a molten caustic soda bath 13 maintained in molten condition by a plurality of spaced combustion tubes 14, each of which passes through the bath from side to side thereof, as clearly appears from Figure 2; electrical immersion heaters could also be employed for heating the bath. The combustion tubes 14 are each provided with a burner such as an oil or gas burner, the products of combustion thus produced passing through the tubes and leaving the tubes at the end thereof opposite the burner end. The molten caustic soda bath 13 has been found to be an excellent heat transferring medium for maintaining the desired temperature conditions in the reaction zone; furthermore, since molten sodium hydroxide is one of the reactants present in the vessel 11, the development of leaks in the walls of this vessel does not cause contamination of the product, as is the case when other heat transfer media are employed, thus permitting the fusion to continue until it is convenient to shut down the apparatus. The use of a molten sodium hydroxide bath, as distinguished from the usual heating bath composed of molten sodium nitrate and sodium nitrite, also eliminates the danger of explosions due to leakage of the fusion mass into such nitrate-nitrite baths. Bath 13 has the base portion thereof suitably insulated, as indicated by reference numeral 15, to minimize heat losses.

The top of the vessel at the feed end thereof, indicated by reference numeral 16, is provided with two flanged nozzles 17, 18 which may be suitably connected to feed lines for supplying caustic soda and sodium benzene sulfonate reactants respectively to the reaction vessel. The top of the discharge end of the trough-like vessel 11 is provided with a flanged nozzle 19 which may communicate with a suitable line through which vapors, such as steam, may escape from the reaction zone. This end of the reaction vessel is also provided with an opening 21 (Figure 2) equipped with a suitable cover, which opening may be employed for purposes of inspecting the contents of the reaction vessel. The discharge end of the vessel is also provided with a pipe 22 projecting from an end wall thereof, through which the reaction product flows continuously from the reaction vessel.

A shaft 23 passes through stuffing boxes 24, 25 in the side walls of the vessel 11 and is suitably journaled for rotation in these side walls. At spaced points along the shaft, arms 26 are fixed thereon. Agitator paddles or blades 27, designed so as to lift solid material in the reaction mixture (sodium sulfite) to the level of overflow pipe 22, are welded or otherwise secured to the arms 26, preferably at an angle of about 15° thereto. These paddles extend the length of vessel 11 to within short distances of the ends thereof and are mounted so that when moved past the bottom wall of the vessel they just clear this wall; this small clearance is indicated by the reference numeral 28 in Figure 2. Shaft 23 also has fixed thereto circular baffle 34, the diameter of which is two to three inches less than the diameter of vessel 11; this baffle forces the reaction mixture to flow therearound toward the periphery of vessel 11, insuring adequate agitation thereof. Paddles 27 do not extend beneath nozzles 17, 18 since introduction of the reactants directly upon the paddles causes caking to develop thereon; a space is therefore left between paddles 27 and the end of vessel 11 into which the reactants fall unhindered. On shaft 23, between the space under nozzles 17, 18 and the end of the vessel, are fixed fan-shaped blades 32 at a pitch of about 45°; these blades, upon rotation of shaft 23, force reactants introduced through nozzles 17, 18 toward paddles 27. Furthermore, paddles 27 are preferably not extended to the discharge end of vessel 11, but are terminated short thereof to provide for space for insertion of a thermocouple well and to prevent slopping of the reaction material into discharge pipe 22; fan-shaped blades 32', fixed to shaft 23 at a pitch of about 15°, are disposed in this space to insure thorough mixing of the reaction mass before being discharged through pipe 22.

Rotation of shaft 23 moves the agitator blades 27 within the reaction vessel or zone 11 so as to agitate the reactants in a circumferential direction within the vessel, i. e., in a direction at right angles to the direction of flow, without, however, causing substantial agitation of the reactants in their direction of flow through the vessel from the inlet end to the discharge end thereof. Hence, throughout any section of the reaction mixture taken in a direction at right angles to the direction of flow of the reactants the reaction mixture is substantially homogeneous, but along the direction of flow the composition of the reaction mixture varies continuously from unreacted material at the inlet end 16 to completely reacted material at the point where the reaction product is discharged into the pipe 22.

Vessel 11 is provided with a line 29 for withdrawing product for draining purposes. Line 31 communicates with the caustic soda bath 13 for the purpose of supplying caustic soda to this bath or withdrawing it from time to time when desired. Flake caustic could be fed in from the top of the bath through openings at 33 between combustion tubes 14.

In the modification of the invention illustrated in Figures 3 and 4, the reaction vessel 35, instead of being stationarily fixed, as in the case of vessel 11, is suitably mounted for rotation in bearings, indicated by the reference numerals 36. This vessel may be heated by direct flame supplied by an oil or gas burner 37 which is disposed beneath the vessel 35. Vessel 35 is disposed in a suitable housing or hood 38 through which the products of combustion from burner 37 pass, heating the vessel; the products of combustion leave the hood through the elongated slot 39 at the top thereof.

The interior of vessel 35 is provided with a series of circumferentially spaced arms or baffles 40 running from end to end of the vessel. Upon rotation of the vessel agitation of the reactants is effected in a direction substantially perpendicular to the direction of flow while avoiding substantial agitation along the direction of flow, so that throughout any section of the reaction mixture taken in a direction at right angles to the direction of flow the reaction mixture is substantially homogeneous but along the direction of flow the composition of the mixture varies continuously from substantially unreacted material at the inlet end of the vessel to completely reacted material at the point where the reaction product is withdrawn from the vessel.

Caustic soda and sodium benzene sulfonate may be supplied to the reaction vessel 35 by a hopper 41 equipped with a screw conveyor 42 driven by a pulley 43 so as to discharge the material from the hopper 41 continuously into the inlet end of the reaction vessel 35. A sufficient charge of reactants is maintained in hopper 41 to seal the inlet 44 to the reaction vessel 35. The reaction product is continuously withdrawn through nozzles or openings 45 in the discharge end of the reaction vessel.

The caustic soda may be supplied to the reaction vessels hereinabove described in molten form, or, if desired, in solid form, alone or mixed with sodium benzene sulfonate. Water solutions of caustic soda may be used. It has been found, however, that the addition of caustic soda in molten form gives the best results. The amount of caustic soda added should be such as to provide an excess over and above that required for the fusion reaction, thereby keeping the fusion mass molten and permitting it to flow continuously through the reaction zone. From 10% to 20% excess caustic soda, preferably about 18%, above that theoretically required for the fusion reaction, was found to give excellent results.

While the above detailed description has dealt with the fusion of sodium benzene sulfonate with sodium hydroxide, it is to be understood that other fusion reactions may be carried out in accordance with my invention. Thus, for example, the fusion of sodium para-toluene sulfonate with sodium hydroxide to produce sodium para-cresolate, the fusion of potassium benzene metadisulfonate and potassium hydroxide to produce potassium resorcinate, and the fusion of sodium beta-naphthalene sulfonate and sodium hydroxide to produce sodium beta-naphtholate may all be carried out by my invention. The conditions under which these fusions are carried out may vary somewhat from those set forth hereinabove in connection with the fusion of sodium benzene sulfonate and sodium hydroxide. Thus, for example, in the fusion of sodium para-toluene sulfonate with sodium hydroxide, the rates of introduction of reactants and withdrawal of product are preferably adjusted so that the reaction time is between about 40 and about 90 minutes, e. g., about 60 minutes; the temperature of the melt in the reaction zone may be maintained between about 320° and about 380° C., preferably about 355° C. For optimum results an excess of caustic of between about 25% and about 40%, preferably about 30% to 35%, above that theoretically required for the reaction is employed.

The following examples are illustrative of the present invention:

*Example 1.*—A composition containing sodium hydroxide and sodium benzene sulfonate, in the proportion of 1,523 pounds of the hydroxide to 3,285 pounds of the sulfonate, was continuously supplied to a reaction zone; the amount of caustic used represented an excess of 18% over that theoretically required to combine with the sodium benzene sulfonate. The temperature at the inlet end of the reaction vessel was 354° C., the temperature at the discharge end was 390° C. The rate of withdrawal of the reaction product was correlated with the rate of introduction of the reactants so that the reaction time amounted to approximately 30 minutes. As the reactants flowed through the reaction zone they were agitated by rotating agitator arms of the type hereinabove described. A 96% yield of sodium phenolate was thus obtained, and the phenol obtained from this phenolate was of good color and odor.

*Example 2.*—A mixture of sodium para-toluene sulfonate and sodium hydroxide, the latter being present in an amount equivalent to a 35% excess of that theoretically required for the fusion, was continuously supplied to a reaction zone and agitated therein by rotating agitator arms of the type shown in the drawing. The temperature at the inlet end of the reaction vessel was 355° C. and the temperature at the outlet end was 360° C.; the rate of feed of reactants and the rate of withdrawal of reaction product were correlated so that the reaction time amounted to about 1 hour. An excellent yield of sodium cresolate was obtained.

It will be noted that this invention provides a continuous process for carrying out fusion reactions, which process obviates the disadvantages of batch operations hereinabove pointed out; more specifically, a fusion process is provided whereby excellent yields of sodium phenolate are obtained from which may be recovered phenol of high quality and good odor.

It is to be understood that reference throughout the specification and claims to "continuous" fusion reactions is intended to cover all fusion reactions wherein the product of the fusion is continuously produced and withdrawn from the reaction zone continuously or at regular intervals; the reactants may be added continuously or intermittently at regular intervals, as desired.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense. For example, the reaction vessel could be divided into a series of compartments by means of weirs suitably disposed within the vessel, so that the reaction mixture is agitated in each compartment and flows over said weirs from compartment to compartment, substantially completely reacted material being withdrawn from the last compartment.

I claim:

1. The method for continuously carrying out a fusion reaction between an aromatic sulfonate and an alkali metal hydroxide, which comprises introducing the reactant materials into a reaction zone and causing them to flow therethrough in a substantially horizontal direction, while agitating the fused reaction mixture in a direction substantially perpendicular to the direction of flow but avoiding substantial disturbance along the direction of flow, so that throughout any section of the reaction mixture taken in a direction at right angles to the direction of flow the reaction mixture is substantially homogeneous, but along the direction of flow the composition of the reaction mixture varies continuously from unreacted material at the point of introduction of said reactants to substantially completely reacted material at a point where the product of the reaction leaves said reaction zone.

2. The method for continuously carrying out the caustic fusion of sodium benzene sulfonate to produce sodium phenolate, which comprises introducing sodium benzene sulfonate and a 10% to 20% excess of sodium hydroxide over that theoretically required into a reaction zone maintained at a temperature such that the temperature of the melt is from 320° to 410° C., causing the reactants to flow continuously through said zone in a substantially horizontal direction at a rate such that they are subjected to a heating time of from 15 to 40 minutes; agitating the fused reactants in a direction substantially perpendicular to the direction of flow while avoiding substantial disturbance along the direction of flow, so that throughout any section of the reaction mixture taken in a direction at right angles to the direction of flow the reaction mixture is substantially homogeneous, but along the direction of flow the composition of the reaction mixture varies continuously from substantially unreacted material at the point of introduction of said reactants into said reaction zone to substantially completely reacted material at the point where the reaction product is withdrawn from said reaction zone; and continuously withdrawing the reaction product from said reaction zone.

3. The method for continuously carrying out a fusion reaction between an aromatic sulfonate and an alkali metal hydroxide which comprises introducing the reactants into a reaction zone maintained at a temperature such that the temperature of the reaction mixture is between 320° and 410° C., causing the reactants to flow through said zone in a substantially horizontal direction, and agitating the reactants in a direction substantially perpendicular to the direction of flow while avoiding substantial disturbance along the direction of flow, so that throughout any section of the reaction mixture taken in a direction at right angles to the direction of flow the reaction mixture is substantially homogeneous, but along the direction of flow the composition of the reaction mixture varies continuously from unreated material at the point of introduction of said reactants to substantially completely reacted material at the point where the reaction product is withdrawn from the reaction zone.

4. The method for continuously carrying out fusion of sodium benzene sulfonate with sodium hydroxide to produce sodium phenolate which comprises introducing sodium benzene sulfonate and a 10% to 20% excess of sodium hydroxide over that theoretically required into the inlet end of a reaction vessel maintained at a temperature such that the temperature of the melt is from 320° to 410° C., causing the reactants to flow through said vessel in a substantially horizontal direction, agitating the reactants in a direction substantially perpendicular to the direction of flow while avoiding substantial disturbance along the direction of flow so that throughout any section of the reaction mixture taken in a direction at right angles to the direction of flow the reaction mixture is substantially homogeneous, but along the direction of flow the composition of the reaction mixture varies continuously from unreacted material at the point of introduction of said reactants to substantially completely reacted material at the point where the reaction product is withdrawn from the reaction vessel, and continuously withdrawing reaction product from the outlet end of the vessel.

JOHN M. HARRIS, Jr.